United States Patent [19]
Majid et al.

[11] Patent Number: 5,882,429
[45] Date of Patent: Mar. 16, 1999

[54] METHOD OF SOIL REMEDIATION BY CONCURRENT REMOVAL OF HYDROCARBONS AND FIXATION OF HEAVY METALS

[75] Inventors: Abdul Majid, Ottawa; Bryan Sparks, Glocester, both of Canada

[73] Assignee: National Research Council of Canada, Ottawa, Canada

[21] Appl. No.: 900,865

[22] Filed: Jul. 25, 199711260

Related U.S. Application Data

[60] Provisional application No. 60/022,654 Jul. 26, 1996.
[51] Int. Cl.[6] .............................. B08B 3/04; B08B 7/04; B08B 3/06
[52] U.S. Cl. ............................ 134/10; 134/25.1; 134/26; 134/40; 134/42
[58] Field of Search ............................. 134/10, 25.1, 26, 134/40, 42

[56] References Cited

U.S. PATENT DOCUMENTS

| 5,196,620 | 3/1993 | Gustin et al. | 588/257 |
| 5,202,033 | 4/1993 | Stanforth et al. | 210/747 |
| 5,453,133 | 9/1995 | Sparks et al. | 134/25.1 |
| 5,744,107 | 4/1998 | Fristad et al. | 423/1 |

*Primary Examiner*—Zeinab El-Arini
*Attorney, Agent, or Firm*—J. Wayne Anderson

[57] ABSTRACT

The invention disclosed relates to an improved solvent extraction/soil remediation process for the concurrent removal of hydrocarbon contaminants, and fixation of heavy metals. The improvements include selecting the metal fixation agent for improved hydrocarbon extraction efficiency, and reducing the number of extraction stages to four or five by breaking down and reforming the soil agglomerates between stages,

20 Claims, 8 Drawing Sheets

METHOD OF SOIL REMEDIATION BY CONCURRENT REMOVAL OF HYDROCARBONS AND FIXATION OF HEAVY METALS

This application claims benefit of provisional application 60/022,654 filed Jul. 26, 1996.

BACKGROUND OF THE INVENTION

This application relates to a method for soil remediation, and in particular to the concurrent removal of hydrocarbon contaminants and heavy metal fixation.

Contamination of soil by hazardous organic pollutants and/or heavy metals is a serious environmental problem facing the global community. Over time, these pollutants, trapped in the soil matrix, leach through inadequate holding facilities and migrate deep into the earth, finally making their way to groundwater aquifers. Once contaminated, these aquifers carry the toxins through the ecological system, bringing them into the food chain.

Typically, both heavy metals and hydrocarbon contaminants are associated with the finer particle fractions of soils and sediments. Most techniques for the removal of metals involve contacting the soil with an aqueous solution. Similarly, some processes remove hydrocarbon contaminants by aqueous washing methods. For fine textured, high clay soils these techniques tend to produce intractable sludges having poor solid-liquid separation characteristics. Other soil cleaning technologies, such as thermal desorption, are also poorly suited for treating fine textured top soils because of adverse effects on the associated humic matter or soil mineralogy. In such cases the treated soil may have to be landfilled or used as subsoil because of impaired soil fertility.

DESCRIPTION OF THE PRIOR ART

In our previous U.S. Pat. No. 5,453,133, the disclosure of which is incorporated herein by reference, liquid phase agglomeration techniques, in combination with solvent extraction have been successfully used for the remediation of fine textured, organic contaminated soils, Agglomeration of fine and coarse particles greatly improves the efficiency of solids-liquid separation, required to achieve effective treatment. Typically, only a few extraction steps are required.

SUMMARY OF THE INVENTION

As an extension of this work, selected metal binding materials have been incorporated into the soil agglomerates formed during the solvent extraction of organic contaminants. The combined process allows concurrent removal of organics and fixation of heavy metals. As a result, soil treatment should be more economical, in terms of material handling and equipment costs, than methods which require separate extraction and leaching steps for organic contaminants and heavy metals.

Another advantage of the SESR process is the ease of salt leaching from the dried, extracted soil agglomerates. Agglomerates produced using liquid phase agglomeration techniques are more stable than similar sized, natural aggregates of the same soil. During agglomerated soil drying, any water soluble salts, dissolved in the agglomerate pore water, effloresce and collect at the agglomerate surfaces. This behaviour facilitates their removal by leaching with water.

According to the invention, a method is provided for remediating soil contaminated with hydrocarbons and heavy metals comprising: (a) contacting contaminated soil having 20% or more particles of less than 0.05 mm diameter with a solvent for the hydrocarbon contaminant, in the presence of an aqueous bridging liquid immiscible with said solvent, while agitating to form soil agglomerates substantially free of contaminants and solvent, wherein the amount of bridging liquid is sufficient to fill the internal porosity of the soil agglomerates, and wherein the amount of bridging liquid and the degree of agitation are balanced to control the particular size of the soil agglomerates having substantially the same size distribution as natural soil aggregates, while maintaining the natural humic content of the soil and improving the aggregate strength and agglomerate stability; and (b) separating the substantially, hydrocarbon contaminant—and solvent free soil agglomerates, the improvement comprising, in step (a) adding a metal fixation agent selected from he group consisting of gypsum, sodium metaphosphate and calcium hydroxide, to concurrently fixate the heavy metals.

DESCRIPTION OF THE PREFERRED EMBODIMENTS

Figure 1:
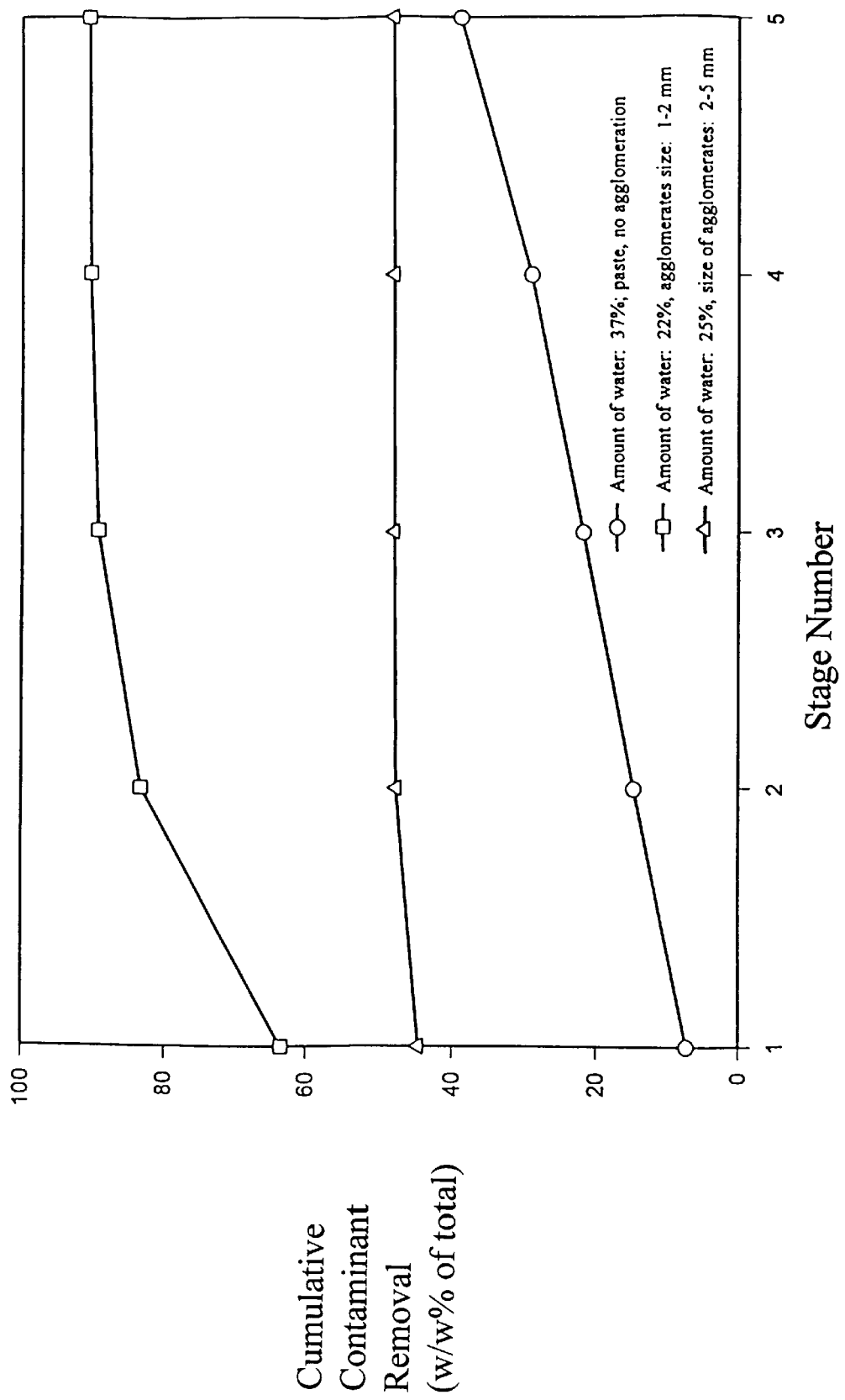
FIG. 1 is a graph which illustrates the effect of the amount of water on the contaminant removal efficiency in hexane.

In this work we present the results for tests In which the SESR process was used to treat a sample of invert drilling mud. The sample, containing 4.9 w/w % diesel fuel, was artificially contaminated with 680 pm of likable lead. Concurrent removal of the hydrocarbon and fixation of lead by incorporation of metal binding agents such as peat, gypsum, sodium metal phosphate and coal combustion fly ashes into the agglomerates was investigated, The affect of solvent type and agitation time, on the extraction efficiency of hydrocarbons was also investigated. Fixation of lead was followed using the U.S. EPA's Toxicity Characteristics Leaching Procedure (TLCP) on the dried agglomerates. The affect of these additives on the extraction efficiency of diesel was also studied. The recovery of residual solvent from the agglomerated soil by drying, was also explored in order to meet the environmental criteria for the Province of Ontario.

EXPERIMENTAL METHODS

Materials. Soil - a used Diesel Invert Drilling Mud (DIDM) sample from Alberta, was used for this study. The sample was artificially contaminated by spiking with a solution of lead nitrate. The composition and properties of the contaminated sample are given in Table 1.

Additives. Peat used in this study was a sample of agricultural peat moss, ground to about 150 μm particle size, using a Brinkman Centrifugal Grinding Mill ZM-1. A sample of this peat, suspended in distilled water, had a pH of 4±0.1. Moisture and organic contents were 2±5 w/w % and 49.7±1.6 w/w % (dry basis) respectively. An ash content of 2.3 w/w % (dry basis) was determined by ignition in a muffle furnace at 400±10° C. No detectable amounts of lead were found in the TCLP leachate from peat.

Gypsum used in this study was a sample of scrubber sludge obtained courtesy of Joel Colmar of Western ash company Arizona, It was dried at 110° C. before use. The X-ray analysis of this sample suggests, gypsum ($CaSO_4.2H_2O$) as the major component white calcite ($CaCO_3$) and quartz ($SiO_2$) as the minor components.

Coal combustion ash samples were also supplied courtesy of Joel Colmar of Western ash company Arizona. The active ingredients of these samples according to X-ray analyses were: $CaO$ (25–40%) and $MgO$ (5–15%).

Coarse sand used as an agglomeration aid was washed with distilled water, dried at 110° C. and then ashed at 400±10° C. to a constant weight. Its particle size distribution was as follows:

| Size | Wt. % (dry basis) |
|---|---|
| >1.7mm | 8 |
| 850μm–1.7mm | 23 |
| 425μm–850μm | 35 |
| 150μm–425μm | 31 |
| <150μm | 3 |

Reagent grade sodium metaphosphate was obtained from Anachemia. All solvents used were of HPLC grade.

Estimation of Oil Content of Diesel Invert Drilling Mud (DIDM)

The amount of oil contained in DIDM was estimated by extracting the oil in toluene using the Dean and Stark Soxhlet method[1]; extraction was carried out for 20 hours. The extract was characterized and subsequently quantitated by GC. The GC chromatogram of the extract had a good match with the chromatogram of a sample of diesel obtained from a local gas station in the summer of 1995. This diesel sample was therefore, used for preparing calibration standards. All calculations for the extraction efficiency of SESR process are based on the amount of diesel extractable from DIDM by Dean and Stark Soxhlet method.

Agglomeration Procedure

In a typical test a Waring Blendor Jar (500 mL polypropylene) equipped with Teflon washers and a plastic cover was accurately weighed. To the jar were added: DIDM (100 g) lead fixation reagent, additional water or sand, if required, and solvent (250 mL). The jar was weighed at each stage in order to determine the amount of each ingredient added. The contents were agitated at high shear for 1 minute followed by 2 minutes at low shear. The solution was carefully drained through a preweighed glass filter paper and the filterate collected in a preweighed 250 mL glass measuring flask. After the filtration was finished, the filter paper was reweighed in order to calculate the amount of solids and solution retained. The filter paper was dried at 110° C. and the amount of solids lost on the filter paper determined; amount of solution was calculated by difference. The flask containing the solution was also reweighed in order to obtain the amount of solution collected. The amount of agglomerates plus residual contaminant and solvent was obtained from the weight of jar plus contents after draining the solution. This completed stage 1. The process was repeated four more times with fresh solvent. In the subsequent stages the high jar plus contents after draining the solution. This completed stage 1. The process was repeated four more times with fresh solvent. In the subsequent stages the high shear agitation was maintained for 30 seconds instead of 1 minute as in stage 1. Total agitation time for stages 2 to 4 remained 2.5 minutes. The following Illustrates mass balance calculations.

Wt. of jar plus lid, g: A
Wt. of jar plus total solids, g: B
Wt. of jar, total solids plus solvent, g: C
Wt. of solvent, g: C–B=D
Wt. of total feed, g: C–A=F
Wt. of 250 mL measuring flask, g: E
Wt. of 250 mL measuring flask plus diesel solution recovered, g: G
Wt. of diesel solution recovered, g: G–E=H
Wt. of filter paper, a: I
Wt. of filter paper plus lost solution and solids, g: J
Wt. of lost solution plus solids, g: J–l=K
Wt. of filter paper plus lost solids, g: L
Wt. of lost solids, g: L–I=M
Wt. of lost solutions, g: K–M=N
Total wt. of solution recovered, g: H+N=O
Wt. of jar plus agglomerates and residual solution, g: P
Wt. of agglomerates plus residual solution, g: P–A=Q
Total recovery, g: Q+O=R
Percentage of feed recovered, g: (R/F)×100

The overall mass balance for the three solvents used in this study was as follows:

Hexane: 96.0±1.54
Toluene: 98.2±0.70
Trichloroethylene: 96.4±0.44

Partial agglomeration was achieved in glass jar with considerable amounts of wet solids sticking to the walls of the jar. Solids did not stick to the walls of the jar when polypropylene jar was used. Also good microagglomerates of approximately 0.1–1 mm size were obtained in a polypropylene jar with optimum amounts of water or sand added.

A few tests were carried out on a paint shaker and on a roller at 15% critical speed in order to investigate the effect of agitation mode on the extraction efficiency of diesel from DIDM. However, because of poor extraction efficiency achieved in these tests, all subsequents tests were carried out on a Waring Blendor.

Determination of Diesel. The extract was analyzed employing a Varian Model 3300 GC equipped with an, FID detector and a temperature gradient program, The column used was a DB-5, megabore, capillary column, 30 meters in length with a 0.53 mm internal diameter and a 1.5 micron film thickness (J & W Scientific). The initial operating temperature was 50 degrees Celcius with an initial hold-time of 5 minutes. The temperature was then increased at the rate of 10 degrees per minute to a final temperature of 300 degrees Celsius and held for 5 minutes. Calibration curves were prepared using a sample of Diesel Fuel #2, from a local gas station.

Mass Balance Calculations for Diesel. Agglomerates obtained from stage 5, after removal of contaminant, were extracted by Dean and Stark method to determine residual contaminant for mass balance purposes. These results are shown in Table 2.

Drying Tests. The agglomerated soil was dried in a vacuum oven at various temperatures with subsequent recovery of residual solvent by condensing In a dry ice trap.

Recovery and estimation of residual solvent in dried agglomerates. The residual solvent (toluene) in the dried agglomerates was estimated using three independent techniques as described below:

1. Supercritical Fluid Extraction (SFE). Toluene was first extracted by a Supercritical Fluid Extraction (SFE) method using an ISCO SFX-210 extraction unit with CO2 (SFE grade, air products) and an ISCO Model 260D syringe pump operating at 5000 psi. Pulverized soil samples (3 g) were placed in a 2.5 mL stainless steel extraction cell from ISCO. The flow rate of the supercritical fluid through the extraction cell was controlled at 0.3–0.5 mLs/minute (as liquid CO2 measured at the pump) by a variable flow heated restrictor from ISCO kept at 25° C. Collection of the extracts was performed by inserting the outlet of the restrictor into 10 mL of methylene chloride contained in a 20 mL screw-top glass vial (16×150 mm from kimble kimax). During SFE the collection vial was kept in a small beaker containing ice.

The quantitative estimation of the residual toluene in the SFE extracts was carried out by GC, employing a Varian Model 3300 GC equipped with an, FID detector. The column used was a DB-5, megabore, capillary column, 30 meters in length with a 0.53 mm internal diameter and a 1.5 micron film thickness (J & W Scientific). The column operating temperature was 35 degrees Celsius.

2. Methanol Extraction, Dried agglomerates (10 g) were weighed into a tared 20-mL vial, using a top-loading balance. 10 mL of HPLC grade methanol was added quickly to the vial, which was then capped and shaken by hand for 2 minutes[2]. The contents were centrifuged and an aliquote of the extract analyzed by GC.

3. Headspace GC. Dried agglomerates (1 g) were weighed into a tared 10 mL glass vial, which was then sealed using teflon coated silicon rubber septum and aluminium cap. The vials were thermostated at 60° C. for two hours in a aluminium block heater. 10 $\mu$L of headspace was then removed using a gas tight syringe, for analysis by GC using a manual injection technique.

Leaching Tests. The TCLP extractions were performed according to the methods described in the U.S. Federal Register[3] and specified in SW-846[4].

Analysis of Lead. Lead was analyzed by Inductively Coupled Plasma Spectroscopic Analysis (ICP). Mass balances for total lead were carried out by analyzing leached as well as unleashed samples of blank spiked soil and soil-additive mixtures. Screening tests for lead were carried out using Hatch Colorimeteric methods.

Carbon analysis of dry solids: Total carbon was determined using a Leco CR12 carbon analyzer. Organic carbon was determined after decomposing carbonate carbon with dilute hydrochloric acid; carbonate carbon was then determined by difference.

RESULTS AND DISCUSSION

Contaminated soils pose a significant challenge for characterization and remediation a programs. The first challenge In the evaluation of any remediation process for oily wastes is the reliable estimation of the total oil content of the contaminated material. This number is essential in order to evaluate the contaminant removal efficiency of the process. Dean & Stark extraction is the most used method for this purpose[5]. Quantitative estimation of the extent of contamination in the Diesel Invert Mud (DIM) sample used in the present investigation was carried out using this method coupled with the determination of the total diesel in the toluene and methylene chloride extracts by GC. As shown in Table 1, in the mass balance experiments we were able to account for 99.94% of the total constituents (oil, water and solids). All calculations regarding the extraction efficiency of diesel from DIM by Solvent Extraction Soil Remediation (SESR) process are based on the amount of diesel extractable by Dean and Stark method.

Process Optimization

Process optimization included: the amount of bridging liquid (water) and the agitation time so as to get microagglomerates in the 0.5–2 mm size range. The data plotted in FIG. 1, illustrates the effect of the amount of water on the contaminant removal efficiency in Hexane. The maximum contaminant removal efficiency was achieved when the agglomerates were in the 1–2 mm size range. This is because of the fact that, with the optimum amount of water the system enters the capillary state, producing an agglomerate of maximum density and strength in which the internal pore volume is virtually devoid of suspending liquid[6].

Figure 2:
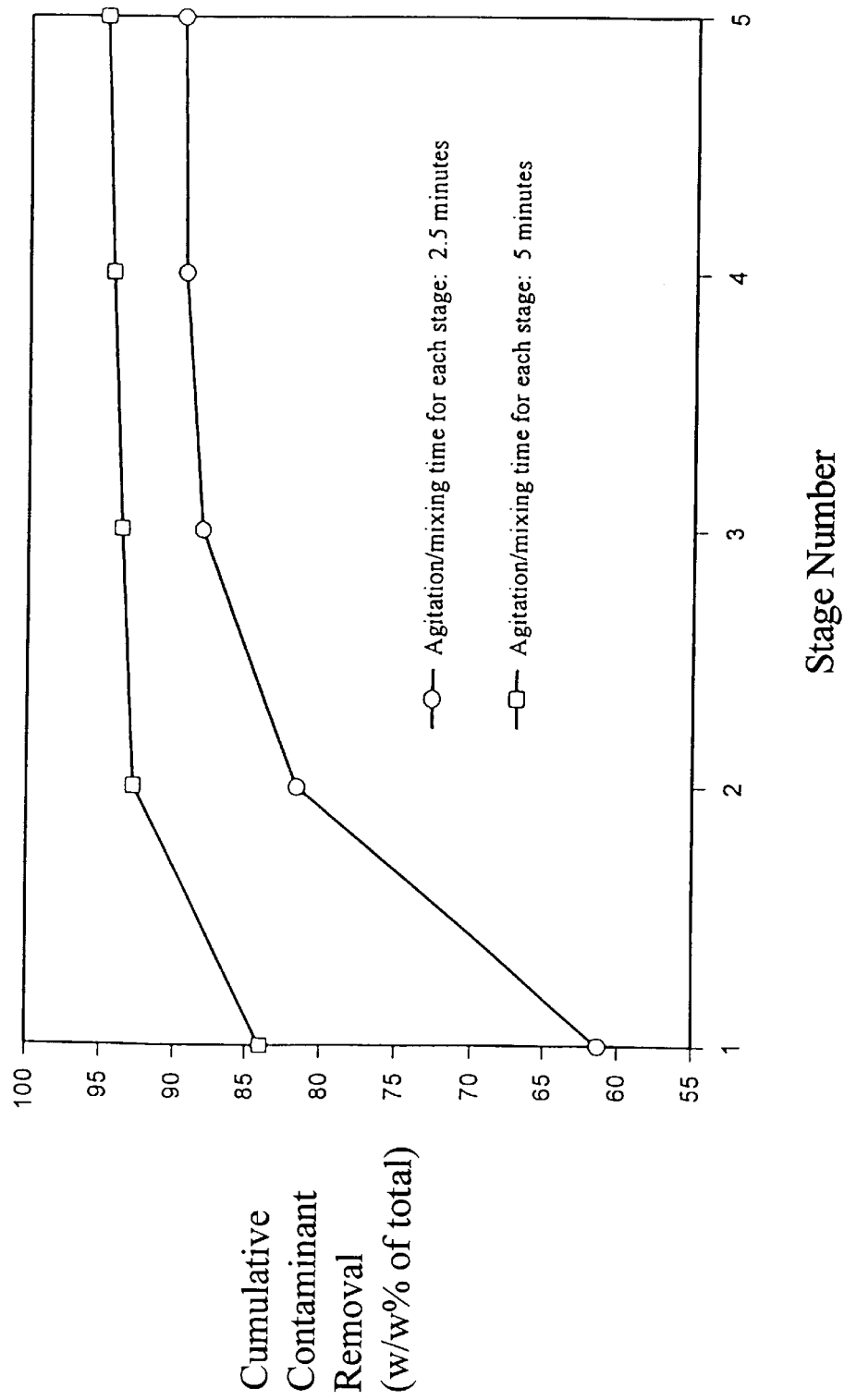
FIG. 2 illustrates the effect of agitation and mixing time on contaminant removal efficiency in hexane.

FIG. 2 illustrates the effect of agitation and mixing time on the contaminant removal efficiency in Hexane. Although contaminant recovery efficiency was much improved in stage 1 for higher agitation times, considering the precision and reproducibility of these results (±5%), there is no significant difference In the overall contaminant removal efficiency at various agitation times. Therefore, all subsequents tests were carried out at short agitation and mixing times of 2.5 minutes.

Contaminant Removal Efficiency under Optimum Conditions of Agglomeration

Under optimum conditions of agglomeration, close to 100% contaminant can be removed in a five stage extraction step. Over 90% of the contaminant is removed during the first two stages and the rest in the last three stages.

The Effect of Additives (Metal Binding Agents)

Figure 3:
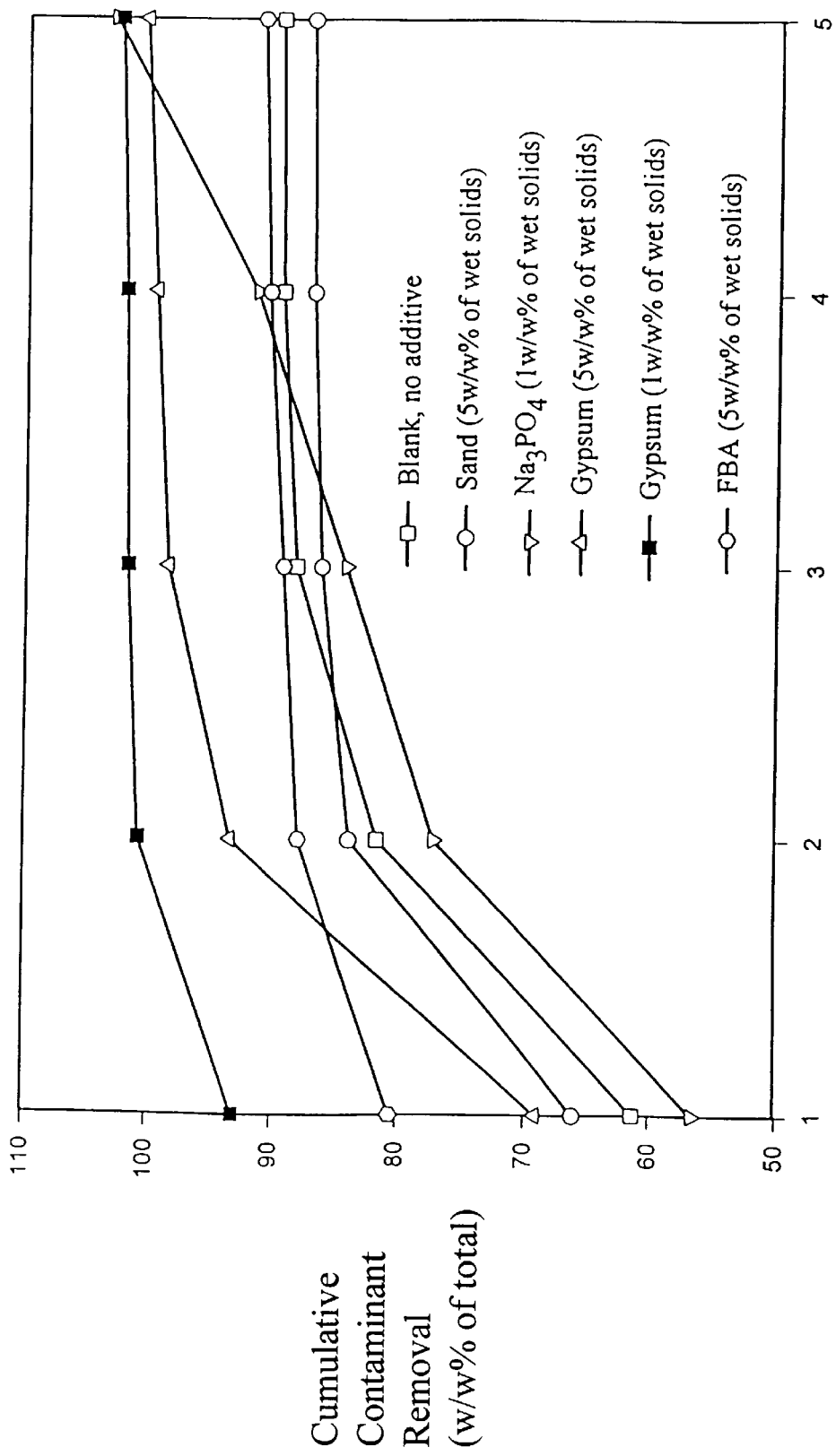
FIG. 3 is a graph illustrating the effect of various metal binding agents on contaminant removal efficiency in hexane.

Several metal binding agents such as gypsum, sodium metal phosphate, peat and coal combustion ashes were incorporated into the agglomerates during processing in order to fix lead in the spiked DIM sample. Coarse sand was used to reduce the water content of soil samples spiked with lead nitrate solutions in order to produce agglomerates in the 1–2 mm size range, The effect of these additives on the efficiency of diesel removal by the SESR process was also investigated. Results from batch tests using hexane as a solvent, are summarized in Table 3 and graphically represented in FIG. 3.

Whereas, sand and coal fly ash did not affect the basic extraction efficiency of SESR process, sodium metaphosphate and gypsum had a beneficial effect. Best recoveries were achieved in presence of gypsum. In this case over 90% recovery was achieved in the first stage and almost 100% recovery was obtained by the second stage. Subsequent stages did not extract much more of the contaminant. Although, overall recovery of the contaminant was almost independent of the amount of gypsum, initial recovery was much better with smaller amounts of gypsum. With sodium metaphosphate, overall contaminant removal efficiency was comparable to the case of gypsum, but recovery during the initial stages was considerably lower than in other tests.

Beneficial effect of sodium metaphosphate could be because of its ability to act both as a surfactant helping the removal of contaminant from the surface of soil particles, and as an inhibitor for the formation of water-in-oil emulsion. The reason for the beneficial effect of gypsum is not clear. The standard method for the determination of total petroleum hydrocarbons by solvent extraction involves the addition of dilute hydrochloric acid in order to render soil pH acidic7. It is possible that the addition of gypsum renders soil pH acidic which could be beneficial for the solvent extraction of the contaminant by SESR. Lower contaminant removal in the presence of coal combustion ash may be related to the strength of the agglomerates. Coal combustion ash used in this investigation had a cemetious property. The incorporation of this ash in the agglomerates produces strong agglomerates that may not easily break during agitation thus making it difficult for the entrapped contaminant to be released to the fresh solvent added during each stage. Breakage and reformation of agglomerates is important for good mixing and efficient recovery of the contaminant during agitation.

The Effect of Solvent Type

Figure 4:
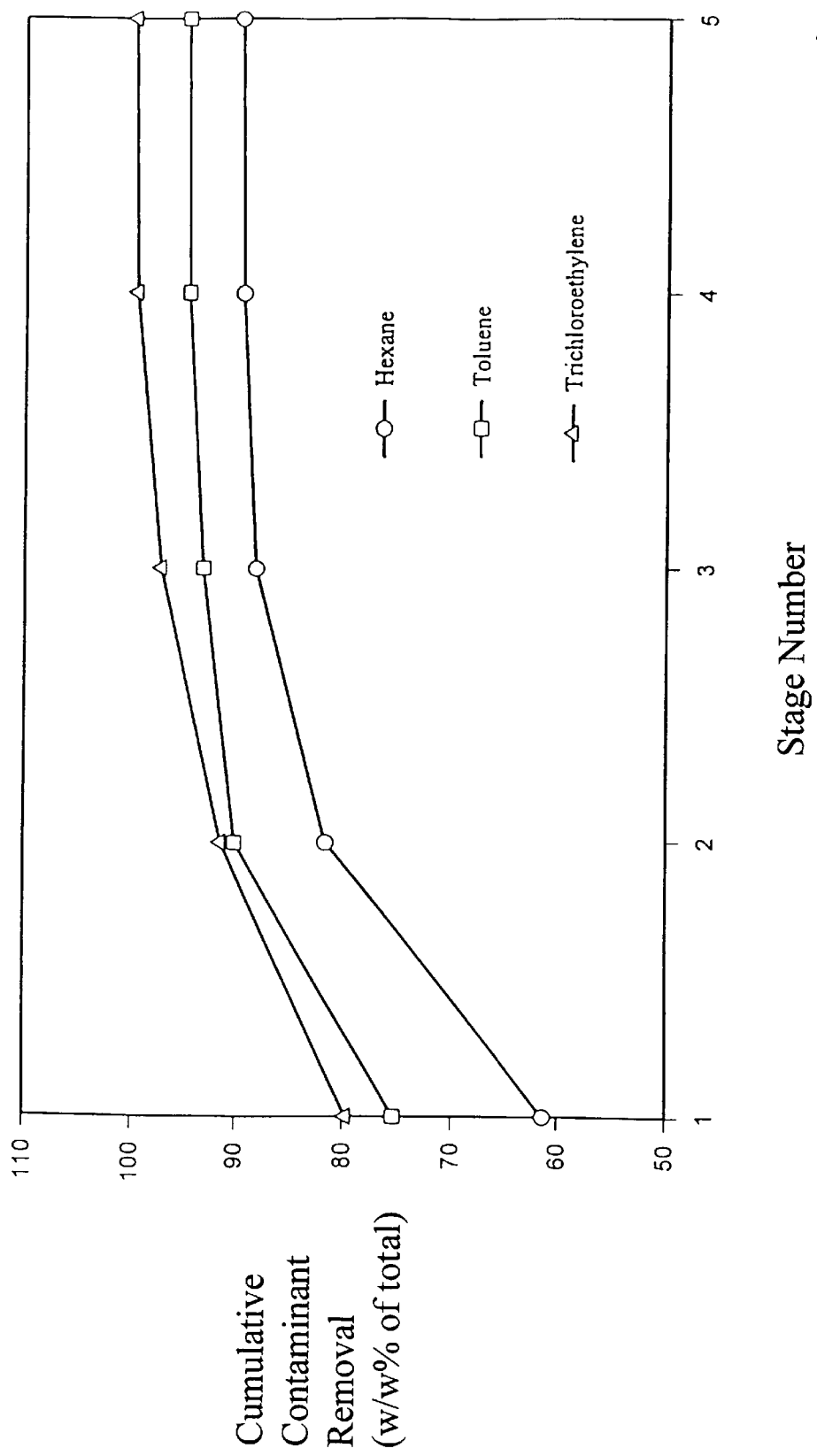
FIG. 4 is a graph illustrating the effect of solvent type on extraction efficiency of diesel from DIM.

Case 1: No additive. The choice of organic solvent affects oil extraction efficiency. For example polar organic solvents have been shown to give improved extraction efficiency for petroleum hydrocarbons8. For this investigation we have tested the extraction efficiency of SESR using three solvents: hexane a non polar solvent from alkane series, trichloroethylene a polar solvent and toluene an aromatic solvent. Test results for the three solvents in the absence of additives have been plotted in FIG. 4. Although, total contaminant recovery had no significant effect by solvent type used, the initial recovery was much lower for hexane case. Toluene and trichloroethylene gave essentially similar recoveries.

Figure 5:
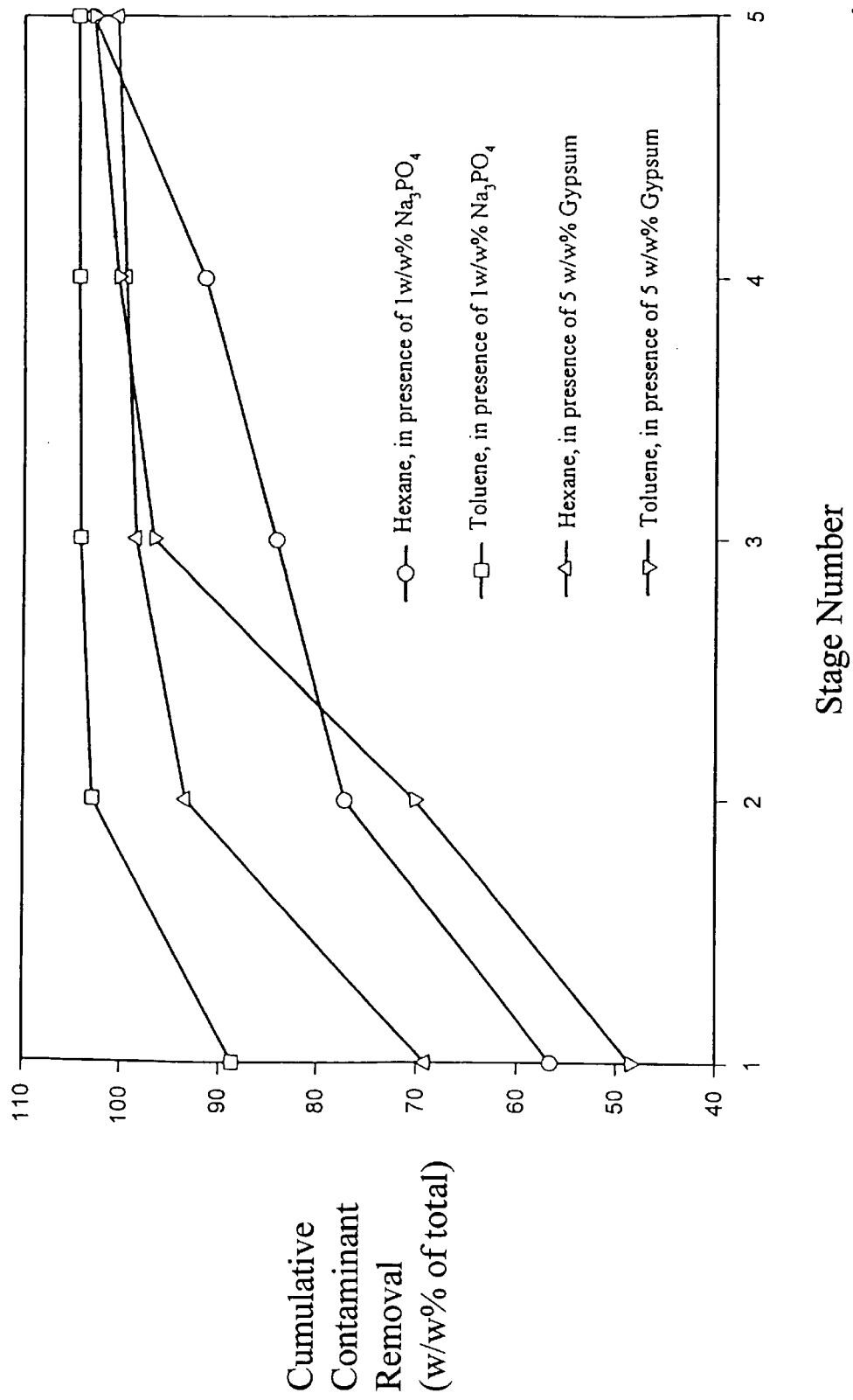
FIG. 5 is a graph along the lines of FIG. 8, in the presence of metal fixation agents.
Figure 6:
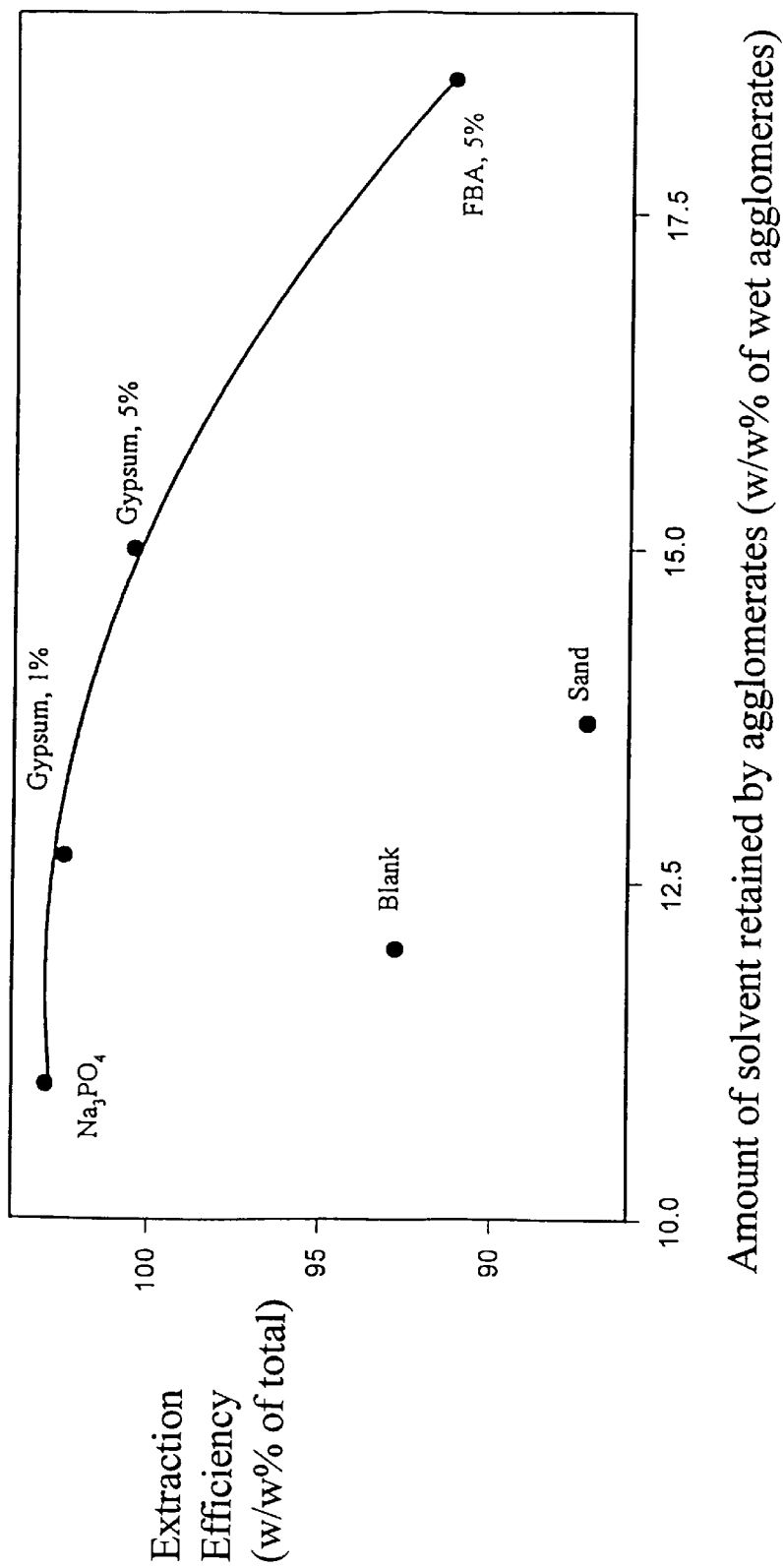
FIG. 6 is correlation between the extractoin efficiency with solvent retention.

Case 2. In presence of additives. The data plotted in FIG. 5 illustrates the effect of solvent type on the extraction efficiency of SESR in presence of sodium metaphosphate and gypsum Incorporated into the agglomerates as lead fixation agents. It is obvious from these plots that the total recovery of the contaminant after five stage extractions is independent of the solvent type used. The beneficial effect of these additives appears to be common in both solvents. However, the recovery in the initial stages appears to be much better for sodium metaphosphate case in toluene. The effect of gypsum appears to be more pronounced in hexane compared to toluene.

Solvent Retention by Agglomerates

The amount of solvent associated with agglomerates was estimated from the weight of the wet agglomerates after drainage of the extraction solution from stage 5, assuming that all solids and water report with the agglomerates. This amount included solvent retained in the pores as well as on the surface of the agglomerates. The highest amount of the solvent was associated with agglomerates containing 5 w/w % of gypsum or coal combustion ash. When the data was plotted against extraction efficiency, the results from tests carried out in the presence of additives produced a second order plot. This suggests that these additives do play a role in the improved contaminant recovery by SESR, possibly by preventing the formation of water in oil emulsions.

Lead Fixation

Several tests were carried out to coagglomerate metal binding agents with a spiked sample of DIM as a means to fix lead. The extracted dried soil samples were leached using U.S. EPA leaching procedure (TCLP) at pH 2.9±0.1 to evaluate the lead fixation capacity of these additives. The results are summarized in Table 4. The data shown in this Table suggests that of all the additives tested, sodium metaphosphate is the most effective reagent for lead fixation. 100% lead fixation was achieved with only 1 w/w % sodium metaphosphate. Gypsum also, appears to have excellent lead binding capacity, However, gypsum did not give reproducible results as seen from different fixation capacities observed in toluene and trichloroethylene. Lead fixation capacities for peat and coal combustion ash sample tested were much lower than sodium metaphosphate and gypsum, suggesting that considerably more quantities of these materials will be required for complete fixation of lead.

CONCLUSIONS

It has been demonstrated that a fine textured, petroleum contaminated soil can be successfully remediated by concurrent removal of organics and fixation of lead to produce an agglomerated product with a similar size distribution to natural aggregates. Up to 100% contaminant removal could be achieved under optimum conditions of agglomeration. Two of the additives incorporated into the soil agglomerates as metal binding agents, appear to have a beneficial effect on the extraction efficiency of process. After drying, to recover residual solvent, the agglomerated soil meets the Province of Ontario's environmental criteria of <1 pm of residual solvent in the remediated soil. Results from the U.S. EPA's Toxicity Characteristics Leaching Procedure (TLCP) on the dried agglomerates suggest that, 100% lead fixation can be achieved by the incorporation of lead fixation reagents into the agglomerates.

In the following example we present the results for tests in which the SESR process is used to treat a highly saline industrial soil sample contaminated with both heavy oils and heavy metals. Concurrent removal of the hydrocarbon and fixation of heavy metals by incorporation of metal binding agents such as phosphate rock and coal combustion fly ashes into the agglomerates was investigated. The degree of heavy metal fixation was determined by the U.S. EPA's Toxicity Characteristics Leaching Procedure (TLCP) on the dried agglomerates. The leaching of soluble salts by percolation of water through a bed of agglomerated soil was also carried out.

EXPERIMENTAL METHODS

Materials

The soil was a mixture of tank bottoms, frac sand and spill material containing a range of organic and inorganic contaminants. It was provided courtesy of Newalta Corporation, Calgary, Alberta. The composition and properties of the contaminated sample are given in Table 7.

Additives

Agricultural peat moss was used as a source of peat for this study; it was ground to about 150 $\mu$m particle size, using a Brinkman Centrifugal Grinding Mill ZM-1. Distilled water containing suspended peat had a pH of 4±0.1. Moisture and organic contents were 25±5 w/w % and 49.7±1.6 w/w % (dry basis), respectively. Ignition in a muffle furnace at 400±10° C. gave an ash content of 2.3 w/w % (dry basis). No detectable amounts of heavy metals were found In the TCLP leachate from peat.

Flue gas scrubber sludge, obtained courtesy of Joel Colmar of Western ash company, located in Arizona, was used as a potential source of gypsum. The sample was dried at 110° C. before use. X-ray analysis of this sample showed gypsum ($CaSO_4.2H_2O$) to be the major component while calcite ($CaCO_3$) and quartz ($SiO_2$) were minor constituents.

Western Ash (fly ash) also supplied other samples of Coal combustion By-Products. X-ray analyses of these materials showed CaO (25–40%) and MgO (5–15%) to be the active ingredients.

The sample of lignin was obtained courtesy of Vince Di Tullio of Albany International (Canada) Inc. A sample of phosphate rock was obtained from White Springs Agricultural Chemicals, Inc. Florida. According to product specification sheet the active ingredients were calcium fluoride phosphate and quartz.

All solvents used were of HPLC grade.

Estimation of Oil Content of Contaminated Solids

The amount of oil contained in contaminated solids was estimated by extraction with toluene, using the Soxhlet-Dean and Stark method[1]; extraction was carried out for 20 hours. The quantitation of the oil component was carried out using a spectrophotometric method[10] based on the linear relationship between the absorbance at 530 nm and the concentration of oil in solution.

For calibration purpose oil samples were obtained from a methylene chloride extract of the soil. Non-filterable solids were removed from the oil extract by centrifugation. The solvent was removed at 40° C. in a Brinkmann rotary evaporator under reduced pressure. The amount of residual solvent in the oil was quantitatively measured using proton NMR[11]. A correction for solvent content was applied to the amount of oil used in the preparation of standard solutions. For spectrophotometric measurements, absorbances at 530 nm were determined for toluene solutions of the oil in the concentration range of 0.01–0.4 w/w %. Plots of the percent oil vs absorbance produced straight line passing through the origin.

Agglomeration Procedure

In a typical test a polypropylene Waring Blendor Jar (500 mL), equipped with Teflon washers and a plastic cover was accurately weighed. To the jar were added: contaminated solids (100 g), and solvent (250 mL). The jar was weighed at each stage in order to determine the amount of each ingredient added. The contents were agitated at high shear for 1 minute. The solution was carefully drained through a preweighed glass filter paper and the filtrate collected in a preweighed 250 mL glass measuring flask. After the filtration the amount of solids and solution retained by the filter paper was determined gravimetrically. The filter paper was dried at 110° C. and the amount of solids remaining with the filter paper measured; the weight of solution with filter paper was calculated by difference. The flask containing the extract was also reweighed to obtain the amount of solution collected. The extract was analyzed by the spectrophotometric method. The amount of extracted solids plus residual contaminant and solvent was obtained from the weight of jar plus contents after draining the solution.

Metal fixation agent, additional water and fresh solvent (250 mL) were added to the Blendor jar containing extracted solids from the primary extraction. The contents were agitated at high shear for 1 minute followed by 5–10 minutes at low shear until the slurry became clear as discrete agglomerates were formed. The solution was drained and agglomerates were surface washed three times with fresh toluene. All washings and the solution were combined and then analyzed spectrophotometrically to determine the amount of oil extracted in stage 2. The washed agglomerates were transferred to a weighed thimble for the determination of residual contaminant by extraction using the Soxhlet-Dean and Stark method. Mass balance calculations were made according to the procedure described above.

The average mass balance, i.e., the average sum of all component determinations from a series of tests was 99.2±0.7.

Multi-stage Extraction. A multi-stage extraction procedure was used to test the ultimate contaminant removal efficiency of the extraction process. The agglomerates obtained from each stage were dispersed in fresh solvent. High shear agitation was applied for one minute in order to break the agglomerates. This was followed by a low shear agitation for five minutes. The process was repeated four more times with fresh solvent. Five separate tests were carried out in order to obtain an adequate amount of agglomerated soil after each extraction stage. The agglomerates were washed three times with fresh solvent before transferring into the extraction thimble for the determination of residual contaminant.

Mixing Efficiency

The effect of more efficient agglomerate breakdown on contaminant removal during staged extraction was determined by crushing the agglomerated soil in a mortar and pestle between stages and then reagglomerating the solids under normal mixing conditions.

Electrical Conductivity of the Extracted Solids

The electrical conductivity of aqueous suspensions of extracted, dry solids was measured using the Ontario Ministry of Environment and Energy (OMEE) revised procedures[12]. The revised method requires a fixed water to soil ratio of 2:1; in the previous method only sufficient water was added to form a paste and the amount varied, depending on soil type; under these conditions it is often difficult to separate enough water for the conductivirt measurements. The use of additional water in the revised procedure requires that the existing guidelines of 2.0 mS/cm (agricultural/residential/parkland) and 4.0 mS/cm (commercial/industrial soils) be reduced to 0.7 mS/cm and 1.4 mS/cm respectively.

Leaching of Soluble Salts

After agglomeration the soil remained saline because all of the water, with dissolved salts, remains in the agglomerate pores. However, drying, to recover residual solvent, causes migration of the water soluble components to the agglomerate surfaces as water is evaporated. Once at the surface the salts are readily removed by leaching a fixed bed of agglomerates with water.

An amount of water corresponding to a water:soil ratio of 2:1 was added to the bed of agglomerates. The leachate flow rate was controlled using an adjustable clamp attached to the leachate outlet tube. Conductivities of the leachate was measured using a Horiba model ES-12 conductivity meter. Collected leachate was recycled until its conductivity did not change more than 0.1 mS/cm between successive washes. At this point fresh water was added and the procedure continued until the conductivity of the leachate was lower than 0.7 mS/cm. At this stage the residual conductivity of the leached agglomerates themselves was measured according to OMEE revised method.

Heavy Metal Leaching Tests

Heavy metal leaching potential of the treated solids was determined by the U.S.-EPA's toxicity test method 1310A and Toxicity Characteristics Leaching Procedure method 1311 as described in the U.S. Federal Register[3] and specified in SW-846[4]. Long term stability of the treated solids in terms of metal leaching was tested using the agency's multiple extraction procedure method 1320.

Analysis of Metals

Heavy metals were analyzed by Inductively Coupled Plasma Spectroscopic Analysis (ICP).

Carbon analysis of dry solids

Total carbon was determined using a Leco CR12 carbon analyser. Organic carbon was determined after decomposing carbonate carbon with dilute hydrochloric acid; carbonate carbon was then determined by difference.

Surface Analysis

X-ray photoelectron spectroscopy (XPS) was performed with monochromatic Kα X-radiation. Samples were lightly pressed into a shallow power sample holder, pumped down to less than 10-6 torr pressure and then introduced Into the analysis chamber of a Kratos Axis XPS. A survey spectrum was run first followed by analysis of two typical areas at high resolution.

RESULTS AND DISCUSSION

Figure 7:
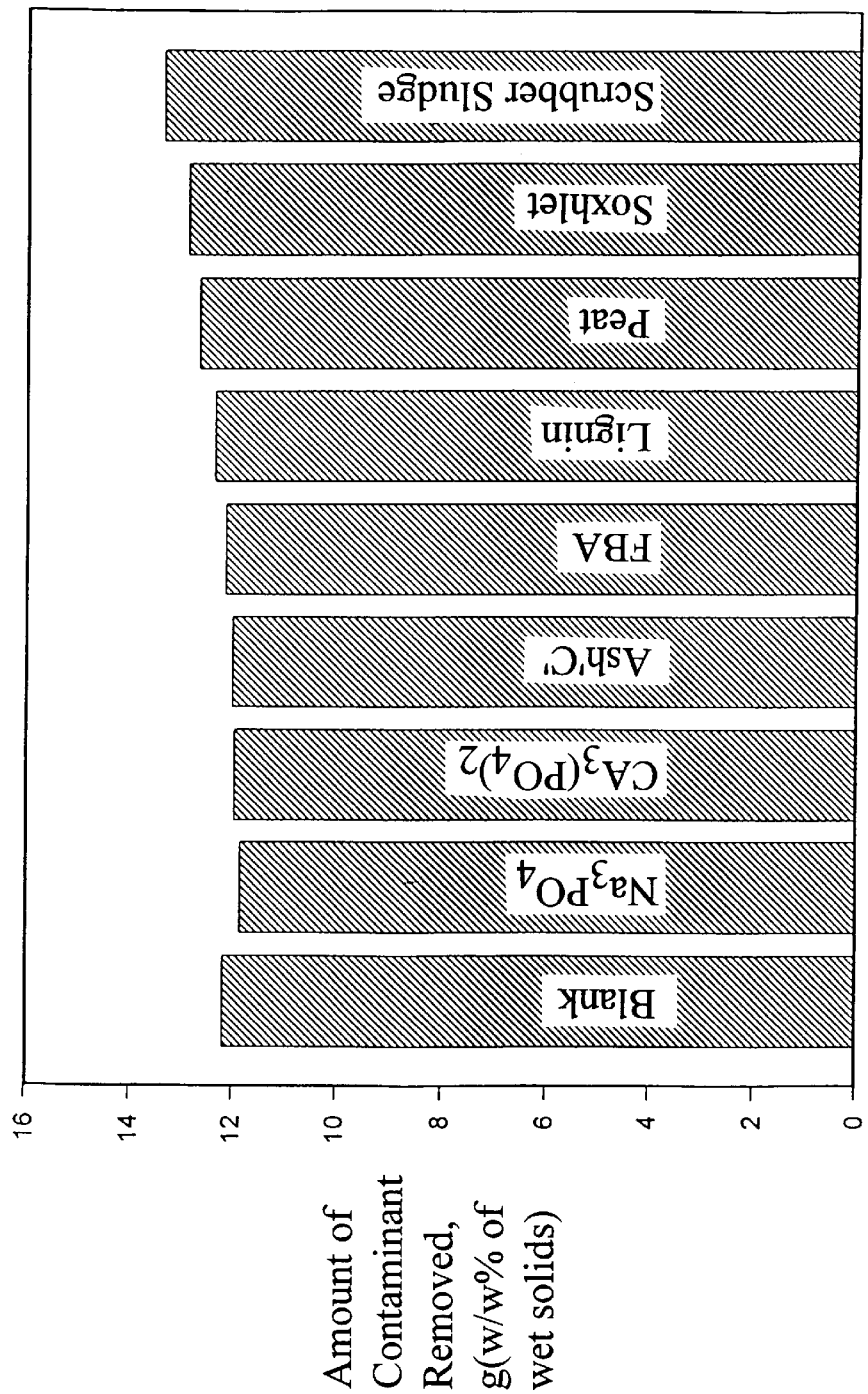
FIG. 7 is a bar graph illustrating the effect of metal fixation additives in the removal efficiency of hydrocarbons.

The SESR process has been tested on a highly saline industrial soil sample contaminated with a heavy oil and several heavy metals. Table 8 summarizes the results for a single stage extraction using toluene as a solvent. The results have also been plotted as a bar chart in FIG. 7. It is obvious from these results that over 90% of the contaminant was removed in a single stage SESR extraction process. The SESR process conditions were optimized in the same manner as described above.

The Effect of Metal Binding Agents

Several metal binding agents, e.g., flue gas scrubber sludge, sodium and calcium phosphates, peat, lignin and coal combustion ashes were incorporated into the agglomerates during processing in order to test their ability to fix likable heavy metals. The effect of these additives on the efficiency of hydrocarbon contaminant removal by the SESR process is illustrated from the bar chart shown in FIG. 7.

Whereas, the phosphates, peat, lignin and coal combustion ashes did not affect the basic extraction efficiency of SESR process, flue gas scrubber sludge appears to have a beneficial effect on oil removal. In this case the amount of contaminant removed even exceeded the amount recovered using the traditional Soxhlet extraction procedure.

Residual Contaminant

Figure 8:
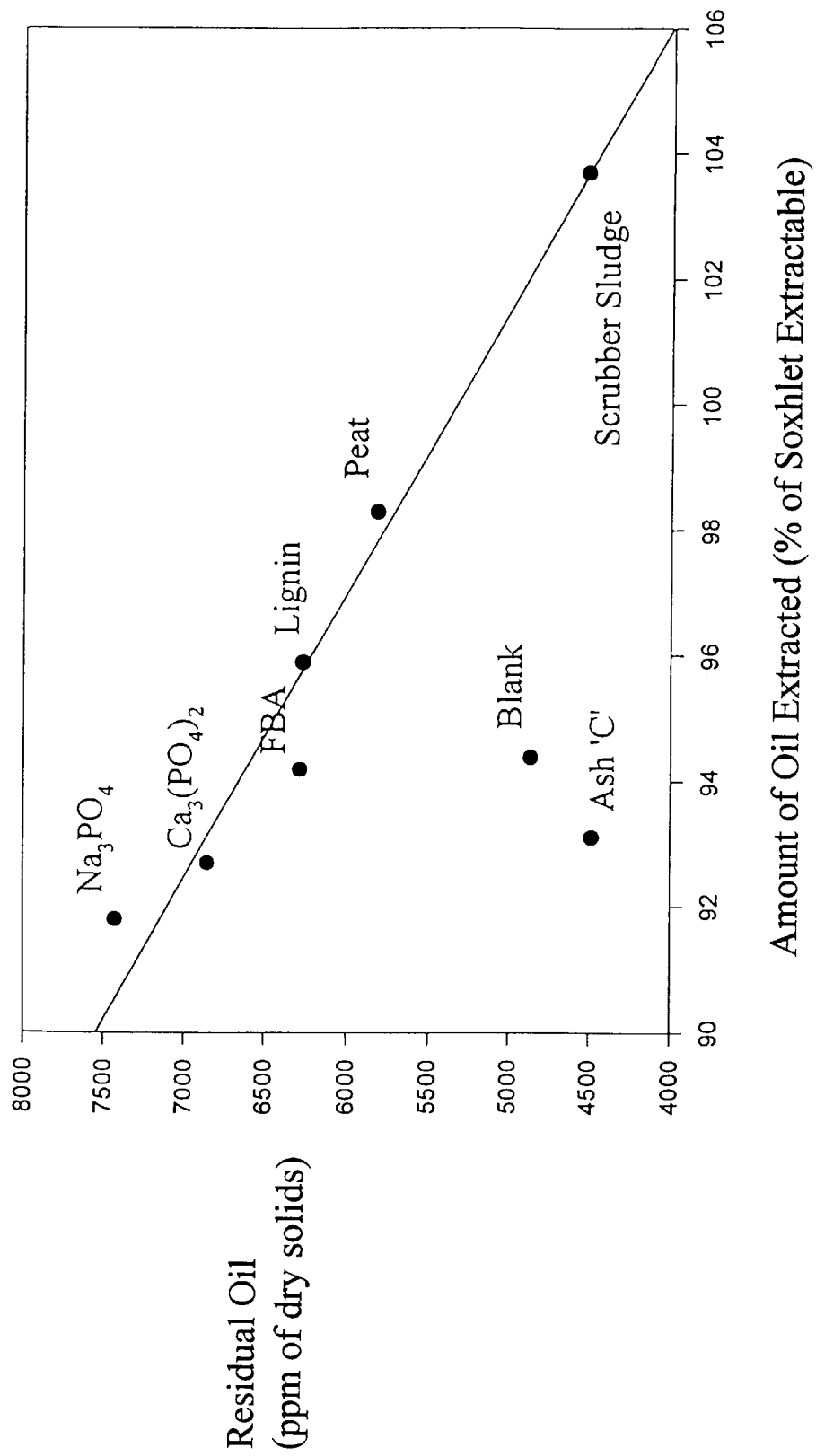
FIG. 8 is a graph illustrating the efficiency of a single stage extraction process.

The amount of residual contaminant in the treated solids was measured for mass balance purposes and to assess the contaminant removal efficiency of SESR. FIG. 8 plots the residual contaminant data for single stage extraction (Table 8) as a function of total contaminant removed. If the data for blank tests and the tests with ash 'C' is excluded then the remaining data can be fitted to a second order equation with a correlation coefficient of 0.957. This suggests that a part of the contaminant is strongly adsorbed on the solids and is not removed during Soxhlet extraction. This is consistent with the higher recovery of the contaminant in the presence of flue gas scrubber sludge. The results also suggest that the additive Ash 'C' acts as an adsorbent for the contaminant.

The residual amount of contaminant, remaining after a single stage extraction, was within the OMEE guidelines of 5000 pm for sub-surface soil disposal. However, for use as surface soil the guidelines for residual contaminant require levels of 1000 pm or less. This level can not be achieved in a single stage process.

Multistage Extraction by SESR

Multistage extraction was evaluated to determine the process's capability to achieve residual contaminant levels within the strict guidelines for residential and parkland use. The results are listed in Table 9; they show that after five stages of extraction, with conventional mixing, the residual contaminant levels are quite close to the guidelines of 1000 pm oil. However, better results were achieved by mechanically breaking down agglomerates between stages and then reforming them during each conventional mixing step. Particulary good results are achieved by $Ca(OH)_2$ after only four extractions. This procedure improved contact between solvent and contaminant entrapped within the agglomerates during their rapid formation. This approach has the potential to reduce the number of cycles required to achieve the regulated levels of residual contaminant in the treated solids.

Heavy Metals Fixation

The solids were contaminated with heavy metal salts of As, Cd, Cr, Pb, Hg and Zn. U.S.-EPA'TCLP tests indicated that the likable amounts of mercury (1.25 mg/L), and lead (29.3±5.0) exceeded OMEE's guidelines of 0.2 mg/L and 5.0 mg/L respectively. Tests were carried out to fix these heavy metals by incorporating, metal binding materials into the soil agglomerates during solvent extraction of organic contaminants. The extracted dried soil samples were evaluated for their heavy metal leaching potential using U.S.-EPA's toxicity test method 1310A and Toxicity Characteristics Leaching Procedure method 1311. Long term stability of the treated solids, in terms of metal leaching, was tested using U.S.-EPA's multiple extraction procedure, method 1320. This method is designed to simulate leaching from repetitive precipitation of acid rain on an improperly designed sanitary landfill. The multiple extractions determine the highest concentration of each constituent that is likely to leach in a natural environment.

Analysis of the leachates obtained using test methods 1310A and 1320 showed that the concentrations of targeted heavy metals were below the detection limit (see Table 9). However, use of the more severe TCLP method showed that only phosphates, flue gas scrubber sludge and coal combustion ash 'C' were found to be completely effective, see Table 10. For peat, lignin and FBA fixation was complete for mercury but only partial for lead.

Leaching of Soluble Salts

The electrical conductivity data, shown in Table 7, demonstrates the high salinity of the contaminated soil, The electrical conductivity of soil is a measure of the total concentration of soluble salts In the soil pore water. High salinity can have a large osmotic influence on plant growth, as well as on soil organisms. OMEE guidelines suggest that the electrical conductivity of soil, measured according to a fixed 2:1 water:soil ratio, should not exceed 0.7 mS/cm for agricultural, residential and parkland use and 1.4 mS/cm for industrial and commercial use. An electrical conductivity value of 0.7 mS/cm corresponds to the boundary between what may "result in a slightly stunted condition in most plants" and "slight to severe burning of most plants"[12].

After agglomeration there was essentially no change in the salinity of dried agglomerates. However, we have demonstrated that during drying, dissolved salts, e.g., brine in the water that fills the agglomerate pores, are subject to efflorescence effects which cause them to concentrate at the surfaces of the agglomerates[9]. These salts are then readily removed in a fixed bed, water leaching system; because attrition of agglomerates Is relatively low the treated soil still retains its desirable size distribution after leaching.

The leaching of brine contaminated agglomerates from this study was carried out by percolation of water through a packed bed of agglomerated soil. The results are listed in Table 11. The leaching of salt was very rapid from agglomerated soil compared to the case for Soxhlet extracted, but unagglomerated, soil solids. The agglomerated blank soil and the samples containing phosphate gave the best results, requiring approximately half the amount of water for leaching compared with the Soxhlet extracted solids. Similarly, leaching times were also much reduced for the agglomerated samples. Several of the leached soil samples met OMEE guidelines for agricultural, residential and parkland use.

The leaching of soluble salts from agglomerates containing FBA as an additive was very slow. Also, the electrical conductivity of the leached solids was higher than OMEE guidelines for both residential and industrial soil uses. We believe that the slow leaching of lime, which is a major constituent of FBA, from the agglomerate matrix, causes this result. This observation suggests that this method is not suitable for evaluating the conductivity of samples containing lime.

Surface Analysis of Solids

Surfaces of cleaned solids and non-settled solids from the solvent phase, after separation of agglomerated soil, were characterized using X-ray photoelectron spectroscopy (XPS). The results are given in Table 12. XPS provides information on the topmost 10 nm layer of the particles. The fact that Si, Al, Fe, Na, Ca and Mg were seen in the XPS spectra for extracted solids suggests that the solids have only a thin layer of organics on the surface. The organic layer consists mostly of carbon atoms with small amounts of O and S. The high-resolution spectra of the carbon peak suggest the presence of some functionalities such a C—OH, C=O, HO—C=O, C—SH. XPS spectra of the ashed samples suggests that most of the oxygen detected in these samples is associated with the mineral matter. The lower amount of carbon in the HCl treated samples compared with the blank samples is because of the decomposition of carbonate by the acid. These results also suggest that the carbonate content of the non-settling solids is much higher than in the bulk solids. Whereas, the treatment of bulk solids with HCl results In the reduction, or complete dissolution of Fe, Na, Ca and Mg, an enrichment of these elements was observed in the residue from non-settling solids after acid treatment.

The lower carbon content of the solids extracted in the presence of flue gas scrubber sludge compared with the solids extracted by the Soxhlet method supports the extraction results found in the SESR tests. The results suggest a beneficial effect of added flue gas scrubber sludge on oil extraction efficiency.

CONCLUSIONS

A highly saline, industrial soil sample, contaminated with a heavy oil and several heavy metals, was successfully remediated using a modified SESR process. Concurrent removal of the hydrocarbon contaminant and fixation of heavy metals was achieved by incorporating metal fixation agents into the soil agglomerates formed during processing. Phosphate rock and coal combustion fly ashes were particularly effective for metal fixation. Over 90% of the oily contaminant was removed in the first stage of the SESR process. At this point the amount of residual contaminant in the treated soil was within OMEE guidelines of <5000 pm for the subsurface soil category. A five stage extraction process, without optimum mixing reduced the residual oil contaminant to levels close to the OMEE guidelines for residential and parkland use. However, better results were achieved by improving the efficiency of mixing to provide more breakdown and reforming of agglomerates. An improvement in mixing has the potential to reduce the number of cycles required to achieve the regulated levels of residual contaminant in the treated solids. Four such extractions with $Ca(OH)_2$ was particularly effective.

Additives used for the fixation of lead and mercury did not, in general, affect the basic extraction efficiency of SESR process. However, flue gas scrubber sludge i.e. gypsum, had a beneficial effect on oil removal; in this case the amount of contaminant removed exceeded the amount recovered using a Soxhlet extraction procedure. The effect was confirmed by the results for surface carbon concentration from XPS analysis of the solids treated in different ways.

The additives tested for the fixation of heavy metals, were effective in rendering these metals non-leachable under the conditions of acid rain. However, when a more rigorous leaching procedure, such as EPA's TCLP, was used only phosphates, flue gas scrubber sludge and coal combustion ash 'C' were found to be completely effective. Peat, lignin and FBA completely fixed mercury but were only partially effective for lead.

Dried agglomerates were leached with water in a fixed bed system to remove residual brine in order to meet OMEE Guidelines for soil conductivity. The required conductivity was reached with less water and in a shorter time for agglomerated solids compared to unagglomerated soil extracted using conventional means.

REFERENCES

1. Syncrude analytical methods for oil sand and bitumen processing, J. T. Bulmer and J. Star Editors. Alberta oil Sands Information Centre, Edmonton, AB, pp. 46–51 (1979).
2. J. L. P. G. Walters and M. Hoffman, "sampling and analysis of soils forgasoline range organics", Hydrocarbon Contaminated Soils and Groundwater, 1, 105–132 (1991), American Chemical Sosciety, Washington D.C.
3. U.S. EPA Federal Register. 51, (142), March 1990, Office of Solid Waste, Washington D.C.
4. U.S. EPA - "test methods for evaluation of solid waste: physical/chemical methods", SW-846, 3rd Ed., Office of Solid Waste and Emergency Response, Washington D.C., Nov. 1986.
5. P. Y. P. Yeoug, R. L. Johnson and S. N. Acharya, "An improved Procedure for determining oil content in wet soil samples"; Analysis of Soil Contaminated with Petroleum Constituents, ASTM STP, 1221, Tracey A. O'Shay and Keith B. Hoddinott,Eds., American Society for Testing and Materials, Philadelphia, 1994.
6. F. W. Meadus, and B. D., Sparks, Sep. Sci. Technol., 1983, 18(4), 341–362.
7. EPA test method 418.1: Total Recoverable Petroleum Hydrocarbons.
8. J. D. Walker, R. R Colwell, M. C. Hamming, and H. T. Ford, "extraction of petroleum hydrocarbons from oil-contaminated sedBulments", in of Environmental Contamination and Toxicology, Vol. 13, No. 2, pp. 245–248 (1975).
9. Meadus, F. W., Sparks, B. D. and Majid, A. "Solvent Extraction Using a Soil Agglomeration Approach", Emerging Technologies in Hazardous Waste Management VI, 1994, 161–176, D. William Tedder and Frederick G. Pohland Editors, American Chemical Society, Washington D.C.
10. Patel, M. S., "Rapid and Convenient Laboratory Method for Extraction and Subsequent Spectrophotometric Determination of Bitumen Content of Bitumininous Sands"; Anal. Chem. 46, 794(1974).
11. Majid, A. and Sparks, B. D., "Total Analysis of Mineral Wastes Containing Bitumen, Solvent, Water and Solids", AOSTRA J. Res. 1, 21–29(1984).
12. Ontario Ministry of Environment and Energy: Standards Development Branch, "Rationale for the development and application of generic soil, groundwater and sediment criteria for use at contaminated sites in Ontario", May, 1996.

| ABBREVIATIONS | |
|---|---|
| SESR | Solvent Extraction Soil Remediation |
| OMEE | Ontario Ministry of the Environment and Energy |
| EPA | Environmental Protection Agency |
| TCLP | Toxicity Characteristics Leaching Procedure |
| ICP | Inductively Coulpled Plasma |
| ND | Not Detected |
| MS/cm | Conductivity in mlliSiemens/cm |

TABLE 1

Composition of Diesel Invert Drilling Mud (DIDM)

| | |
|---|---|
| Total Solids, w/w % (by Dean & Stark) | 82.9 ± 0.3 |
| Water, w/w % (by Dean & Stark) | 12.2 ± 0.4 |
| Organics, w/w % (by GC of the Dean & Stark extract) | 4.84 ± 0.1 |
| Mass Balance (Total of solids + water + organics) | 99.94 |
| Total carbon of dried toluene extracted solids, w/w % | 2.1 |
| Organic carbon content of dried toluene extracted solids, w/w % | 1.1 ± 0.1 |
| Carbonate carbon content of dried toluene extracted solids, w/w % | 1.0 ± 0.1 |

TABLE 1-continued

Composition of Diesel Invert Drilling Mud (DIDM)

| | |
|---|---|
| Clay plus silt content (<45 μm), w/w % of dried solids | 72.6 |
| TCLP leachable heavy metals (mg/kg of sample): | |
| Pb | ND |
| Cd | 1.2 |
| Cr | 2.0 |
| As | ND |
| Se | ND |

ND, Not detected.

TABLE 2

Mass Balance Calculations for the Extraction of Diesel from Diesel Invert Mud

| Test No. | Solvent | Recovery by SESR* (g) | Recovery by SESR* (%)** | Recovery of residual diesel from agglomerates*** (g) | Recovery of residual diesel from agglomerates*** (ppm)**** | Total Diesel** (g) | Total Diesel** (%) |
|---|---|---|---|---|---|---|---|
| 1 | Hexane | 4.22 | 87.2 | 0.55 | 5500 | 4.77 | 98.7 |
| 2 | Hexane | 4.55 | 94.0 | 0.16 | 1600 | 4.71 | 97.3 |
| 3 | Tolune | 5.05 | 104.3 | 0.019 | 19 | 5.169 | 106.8 |
| 4 | Toluene | 4.83 | 99.8 | 0.004 | 4 | 4.834 | 99.9 |
| 5 | Trichloroethylene | 4.82 | 99.6 | 0 | 0 | 4.82 | 99.6 |
| 6 | Trichloroethylene | 4.60 | 99.2 | 0.01 | 1 | 4.61 | 99.4 |
| 7 | Trichloroethylene | 4.24 | 87.6 | 0.14 | 1400 | 4.38 | 90.5 |

*Based on 100 g wet sample
**Based on analysis of original sample
***By soxhlet
****Based on the weight of wet sample

TABLE 3

The Effect of Additives on the Extraction Efficiency of Diesel from DIM (Solvent: HPLC grade Hexane)

Total amount of water (including orignal amount present in DIM), w/w % of dry solids: 22–28%
Size of agglomerates: 0.5–2 mm*
Wt. of sample: 100 g wet
Solids:Solvent ratio, w/w basis: 0.65 ± 0.05
Agitation: Waring Blendor, 1 L plastic jar, stage 1: 1 minute high shear, 2 minutes low shear; stage 2–4: 0.5 minute high shear, 2 minutes low shear

| Test No. | 1 | 2 | 3 | 4 | 5 | 6 |
|---|---|---|---|---|---|---|
| Additive | None | Sand | $Na_3PO_4$ | Gypsum | Gypsum | WAFBA* |
| Amount of the additive, w/w % of wet solids | — | 5 | 1 | 5 | 1 | 5 |
| % Extraction, S-1 | 61.3 ± 2.2 | 66.1 ± 0.8 | 56.6 ± 2.8 | 69.1 ± 4.0 | 93.1 ± 1.6 | 80.5 ± 0.2 |
| % Extraction, S-2 | 81.6 ± 1.8 | 83.8 ± 1.2 | 77.2 ± 1.9 | 93.4 ± 5.0 | 100.7 ± 0.2 | 87.9 ± 0.8 |
| % Extraction, S-3 | 88.2 ± 1.2 | 86.2 ± 2.2 | 84.2 ± 3.7 | 98.5 ± 4.2 | 101.7 ± 0.1 | 89.3 ± 0.1 |
| % Extraction, S-4 | 89.5 ± 1.0 | 87.0 ± 2.1 | 91.6 ± 7.1 | 99.6 ± 3.4 | 102.0 ± 0.1 | 90.5 ± 0.9 |
| % Extraction, S-5 | 89.7 ± 1.0 | 87.2 ± 2.0 | 103.0 ± 6.4 | 100.5 ± 2.4 | 102.5 ± 0.3 | 91.2 ± 1.3 |

*Western Ash co. sample of coal combustion ash

TABLE 4

Summary Results for Concurrent Extraction of Diesel and Fixation of Lead from Diesel Invert Mud (MID)

| Test No | Solvent | Additive (w/w % of wet DIM) | Amount of Diesel Extracted, (w/w % of total)* | Organic C, of extracted dried solids (w/w %) | TCLP Extractable Lead (% fixed)*** |
|---|---|---|---|---|---|
| 1 | Toluene | None | 100** | 1.0 ± 0.1 | 0 |
| 2 | Toluene | None | 94.8 ± 7.9 | 1.1 ± 0.1 | 0 |
| 3 | Toluene | $Na_3PO_4$ (1) | 104.5 ± 9.5 | 1.0 ± 0.1 | 100 |
| 4 | Toluene | Gypsum (5) | 102.9 ± 3.0 | 1.0 ± 0.1 | 83.2 |
| 5 | Hexane | Sand (5) | 87.2 ± 2 | 1.2 ± 0.1 | 2.4 |
| 6 | Hexane | $Na_3PO_4$ (1) | 103.0 ± 4.5 | 1.0 ± 0.1 | 100 |
| 7 | Hexane | WAFBA (5)† | 91.2 ± 1.2 | 1.2 ± 0.1 | 59.4 |
| 8 | Trichloroethylene | Peat (5) | 91.4 | — | 60.9 |

TABLE 4-continued

Summary Results for Concurrent Extraction of Diesel and Fixation of Lead from Diesel Invert Mud (MID)

| Test No | Solvent | Additive (w/w % of wet DIM) | Amount of Diesel Extracted, (w/w % of total)* | Organic C, of extracted dried solids (w/w %) | TCLP Extractable Lead (% fixed)*** |
|---|---|---|---|---|---|
| 9 | Trichloroethylene | $Na_3PO_4$ (5) | 97.9 | 1.1 ± 0.1 | 100 |
| 10 | Trichloroethylene | Gypsum (5) | 100.5 | 1.0 | 100 |

*Based on the Soxhlet extractable amount in original sample using toluene; determined by GC;
**By soxhlet extraction
***As determined using US EPA Toxicity Characteristics Leaching Procedure, based on the amount in orginal sample percentage of total leachable Pb fixed (680 mgs/kg of dry solids)
†Western Ash co. sample of coal combustion ash

TABLE 5

Lead Leachability Results for DIM Samples

Extractable Pb (mgs/L of extract)**

| Test #* | Additive (w/w % of wet solids) | TCLP pH 3 ± 0.1 | EP Toxicity Test, Method 1310A, pH 4.9 ± 0.1 | MEP***, Method 1320 | pH of final extract |
|---|---|---|---|---|---|
| 1(85) | — | 53 | 11 | <2 | 5.9 |
| 2(86) | $Na_3PO_4$ (1) | <2 | <2 | <2 | 6.2 |
| 3(92) | $Ca_3(PO_4)_2$, (1) | 4.7 | 3.4 | <2 | 6.6 |
| 4(87) | FBA**** (5) | 21.5 | 7.0 | <2 | 6.0 |
| 5(89) | Peat (5) | 20.7 | 3.4 | <2 | 5.2 |
| 6(88) | Lignin (1) | 22.1 | 9.4 | <2 | 6.2 |
| 7(91) | Ash 'C'**** (5) | 31.3 | 6.2 | <2 | 6.9 |
| 8(93) | Ash 'F'**** (5) | 43.7 | 5.0 | <2 | 6.2 |

*Numbers in parenthesis refer to page number in book 4645
**EPA and OMEE Regulatory limit: 5 mg/L
***EPA'S Multiple Extration Procedure to monitor long term stability of metal fixation
****Coal combustion ash

TABLE 6

Leaching of Soluble salts from DIM samples after remediation by SESR

| Sample ID[a] | Additive | Sample wt., g | Bed volume, mL♣ | Volume of $H_2O$ added, mL* | Ratio, $H_2O$: Pore vol.** | Contact time, min | Leachate/Filterate collected, mL | Conductivity (mS/cm) at 23.0 ± 0.5° C. Leachate | Leached agglomeraties[b] |
|---|---|---|---|---|---|---|---|---|---|
| Blank | None | 100 | 107 (68.5) | — | — | — | — | — | 24.5 |
| 74-3 | None | 81.0 | 87 (56) | 155[c] | 2.2 | 30 | 115 | 7.95 | 3.04 |
| 77-1 | 1% $Na_3PO_4$ | 100 | 118 (79.5) | — | — | — | 11 | — | 18.41 |
| 77-2 | 1% $Na_3PO_4$ | 86 | 113 (76) | 177.8[c] | 1.9 | 15 | 120 | 15.67 | 0.93 |
| 78-1 | 5% FBA | 75 | 88 (69) | — | — | — | 10.4 | — | 26.6 |
| 78-2 | 5% FBA | 75 | 88 (59) | 145.5[d] | 2.0 | 20 | 70 | 14.59 | 2.66 |

[a]Book 4645
[b]Goal, to achieve a value below 4 mS/cm.
[c]All agglomerates wetted; small amount of agglomerates on the outside broken. Inside all agglomerates intact.
[d]All agglomerates wetted and intact
*Including 30 mL added for dead volume.
**Calculated as: Bed Volume — volume of solids (wt/2.6);
♣pore volume in parenthesis

TABLE 7

Properties of Newalta Soil Sample

| Parameter | Value |
|---|---|
| Oil, w/w % of wet sample[1] | 12.9 ± 0.2 |
| Solids, w/w % of wet sample[1] | 82.2 ± 1.0 |
| Water, w/w % of wet sample[1] | 6.2 ± 1.1 |
| Total of Bitumen, solids and water, | 101.3 ± 0.8 |

TABLE 7-continued

Properties of Newalta Soil Sample

| w/w % of wet sample[1] Size Distribution | |
|---|---|
| −325 mesh solids | 12.2% of total dry solids |
| 100/325 mesh solids | 18.6% of total dry solids |

TABLE 7-continued

Properties of Newalta Soil Sample

Electrical conductivity, mS/cm

| | |
|---|---|
| OMEE Method[2], | 7.4 |
| Alberta Environment method[3], | 22.2 |

Heavy metals

| Metal | Newalta (µg/g) | ICPET (µg/g) | OMEE Guidelines* Industrial Soil | OMEE Guidelines* Agric, Prklnd, Res. |
|---|---|---|---|---|
| B | 2.87 | | 2.0[4] | 1.5[4] |
| Cd | <0.9 | | 12 | 3.0 |
| Cr | <4.0 | 85 | 750 | 750 |
| Cu | 134 | | 225 | 150 |
| Pb | 198 | 1480 | 1000 | 200 |
| Hg | <0.02 | | 10 | 10 |
| Ni | 20.2 | | 150 | 150 |
| V | <2.00 | | 200 | 200 |
| Zn | 37.2 | 104 | 600 | 600 |

*Ontario Ministry of Environment and Energy (Soil, drinking water and air quality criteria: ACES report to OMEE, 1994)
[1]Determined by Dean & Stark-Soxhlet Extraction Method with toluene
[2]Ontario Ministry of Environment Method with water to solids ratio of 2:1, OMEE guidelines call for a value of 0.7 mS/cm for agricultural/residential/parkland soil and 1.4 mS/cm for commercial/industrial use.
[3]This method requires the formation of a paste; Alberta guidelines: 2.0 mS/cm for agricultural/residential/parkland and 4.0 mS/cm for commercial/industrial use.
[4]Available boron based on hot water extraction.

TABLE 9

Multistage Extraction of Contaminant

| Test # | Description | # of cycles* | Residual Contaminant (ppm)** |
|---|---|---|---|
| 1 | No additive | 1 | 4867 ± 723 (3) |
| 2 | No additive | 2 | 2624 ± 284 (2) |
| 3 | No additive | 3 | 2408 ± 26 (2) |
| 4 | No additive | 4 | 1266 ± 40 (2) |
| 5 | No additive | 5 | 1060 ± 39 (2) |
| 6 | 1% Scrubber Sludge | 1 | 3092 ± 61 (3) |
| 7 | 5% Scrubber Sludge | 1 | 4331 (1) |
| 8 | 5% Scrubber Sludge | 3 | 2284 ± 7 (2) |
| 9 | 5% Scrubber Sludge | 4 | 1429 ± 51 (2) |
| 10 | 5% Scrubber Sludge | 5 | 1217 ± 6 (2) |
| 11 | 1% Ca(OH)$_2$ | 1 | 2568 ± 771 (4) |
| 12 | 1% Ca(OH)$_2$ | 2 | 2334 ± 151 (3) |
| 13 | 1% Ca(OH)$_2$ | 3 | 1693 ± 276 (3) |
| 14 | 1% Ca(OH)$_2$ | 4 | 1091 ± 39 (3) |
| 15 | 1% Ca(OH)$_2$ | 5 | 1026 ± 25 (2) |
| 16 | 1% Ca(OH)$_2$ | 5*** | 399 |
| 17 | 1% Scrubber Sludge | 5*** | 902 |
| 18 | 1% Ca(OH)$_2$ | 3 | 1372 ± 194 |
| 19 | 1% Ca(OH)$_2$ | 4 | 839 ± 69 |

*30–35 volts in a Waring Blendor, using polyproplyene jar. Agitation time: 5 minutes. For single cycle, the extracted solids were surface washed three time. For muitiple cycles, one washing was carried out between cycles and three at the end.
**Dry solids basis; figures in parenthesis represent number of tests carried out.
***Agglomerates produced in each stage were transferred into a mortar and pestle; crushed and then transferred back into the Blendor jar for reagglomeration.

TABLE 8

Summary Results for Single Stage Extraction of Heavy Oil from Newalta Sample

| Test No. | Additive* | Feed Recovery (%) | Amount of Non-settling Solids | Amount of Bitumen Extracted*** Percent of wet solids (w/w) | Amount of Bitumen Extracted*** Percent of Total Oil♣ (w/w) | Residual Oil♠ (ppm) |
|---|---|---|---|---|---|---|
| 1 | — | 98.9 ± 0.4 | 2.4 ± 1.5 | 12.16 ± 0.245 | 94.4 ± 1.9 | 4867 ± 723 |
| 2 | Na$_3$PO$_4$ (1) | 98.6 ± 1.1 | 2.6 ± 0.2 | 11.84 ± 0.348 | 91.8 ± 2.7 | 7431 |
| 3 | FBA (5) | 99.4 ± 0.2 | 6.7 ± 1.3 | 12.15 ± 0.335 | 94.2 ± 2.6 | 6288 |
| 4 | Lignin (1) | 99.0 ± 0.8 | 3.6 ± 0.1 | 12.37 ± 0.103 | 95.9 ± 1.3 | 6272 |
| 5 | Peat (2) | 99.5 ± 0.1 | 4.2 ± 0.7 | 12.68 ± 0.258 | 98.3 ± 2.0 | 5815 |
| 6 | Western Ash 'C' | 99.3 ± 0.2 | 3.0 ± 1.2 | 12.01 ± 0.297 | 93.1 ± 2.3 | 4486 |
| 7 | Scrubber sludge (5) | 99.5 ± 0.2 | 3.5 ± 0.4 | 13.38 ± 0.490 | 103.7 ± 3.8 | 4522 |
| 8 | Phosphate Rock (1) | 99.3 ± 0.2 | 2.7 ± 0.5 | 11.96 ± 0.335 | 92.7 ± 2.6 | 6855 |

*Amount as w/w % of wet solids in parenthesis
**Unagglomerated fine solids reporting with solution (w/w % of wet solids)
***Average of five tests
♣Soxlet extractable amount (12.9 ± 0.2)
♠Average amount of residual bitumen remaining on solids after extraction by SESR; determined by Soxhlet extraction using toluene. Vaues are in ppm, calculated on a dry solids basis.
OMEE guidelines for sites contaminated with heavy hydrocarbons:
Surface soil/subsurface (potable groundwater condition): 1000 ppm
Surface soil (non-potable ground water situation case 1: residential/parkland: 1000 ppm
Surface soil (non-potable ground water situation case 2: Industrial/commercial: 5000 ppm
Subsurface soil (non-potable ground water situation case 1: residential/parkland: 5000 ppm
Subsurface soil (non-potable ground water situation case 2: Industrial/commercial: 10000 ppm

TABLE 10

Heavy Metals Leachability Results from US-EPA TCLP tests at 3.0 ± 0.1*

Extractable Heavy Metals (mgs/L of Extract)

| Metal | Feed | EPA & OMEE regulatory limit | Additives: 5% Ash 'C', 5% scubber sludge, 1% phosphates | Additive: 2% Peat | Additive: 5% FBA | Additive: 1% Lignin |
|---|---|---|---|---|---|---|
| As | 2.7 ± 0.1 | 5 | <2** | <2 | <2 | <2 |
| Cd | 0.4 | 1 | <0.3 | <0.3 | <0.3 | <0.3 |
| Cr | <0.05 | 5 | <0.1 | <0.1 | <0.1 | <0.1 |
| Pb | 29.3 ± 5.0 | 5 | <2 | 24 | 12.8 | 26 |
| Hg | 1.25 | 0.2 | <1 | <1 | <1 | <1 |
| Zn | 1.6 | 250 | <0.05 | <0.05 | <0.05 | <0.05 |

*Leachates obtained using test methods 1310A and 1320 did not cantain any of the metals tested.
** < represent method detection limit

TABLE 11

Leaching of Soluble Salts from Extracted Solids ♣

| Test No. | Additive* | Total volume of $H_2O$ for leaching, (mL)** | $H_2O$:Pore Volume, Ratio | Flow Rate (mL/Min) | Total Time (hrs) | Electrical Conductivity (mS/cm) OMEE Method*** | Final Leachate | Leached Solids |
|---|---|---|---|---|---|---|---|---|
| 1[a] | — | 1265 | 59.7 | 3.0 | 20 | 7.4 | 0.3 | 0.53 |
| 2[b] | — | 600 | 31.8 | 10 | 4 | 7.3 | 0.36 | 0.31 |
| 3 | $Ca_3PO_4$ (1) | 600 | 252 | 10 | 3 | 6.7 | 0.48 | 0.65 |
| 4 | $Ca_3(PO_4)_2$ (1) | 600 | 25.2 | 10 | 2.5 | 6.7 | 0.53 | 0.65 |
| 5 | Scrubber sludge (5) | 900 | 39.6 | 10 | 8 | 6.2 | 0.4 | 0.4 |
| 6 | FBA (5) | 1100 | 47.9 | 10 | 5.7 | 7.4 | 0.36 | 2.0 |
| 7 | FBA (10) | 1600 | 70.4 | 3 | 26 | 13.2 | 0.28 | 4.0 |

*Amount as w/w % of wet solids in parenthesis
**Amount of solids used in all tests: 50 g the leachate was recycled until the conductivity of the subsequent leachate did not vary more than 0.1 mS/cm.
***$H_2O$: Solids Ratio is 2:1
[a]Soxhlet extracted blank soilds
[b]SESR blank solids
♣OMEE Guidelines for Electrical Conductivity of Soil:
a) Agricultural, Residential and Parkland Land use Categories: 0.7 mS/cm
b) Industrial and Commercial Land use Categories: 1.4 mS/cm

TABLE 12

Concentrations (atomic percent) of surface elements by XPS

| | Soxhlet extracted solids | | | SESR extracted with scrubber sludge | | | Non-settling solids | | |
|---|---|---|---|---|---|---|---|---|---|
| | Blank | Ashed | HCl treated | Blank | Ashed | HCl treated | Blank | Ashed | HCl treated |
| Total C | 30.3 | 4.1 | 22.2 | 27.8 | 2.9 | 19.5 | 43.8 | 2.5 | 11.6 |
| C-286.1ev* | 17.7 | 4.1 | 14.1 | 16.5 | 2.9 | 13.5 | 29.2 | 2.5 | 7.0 |
| C-286.1ev** | 7.9 | — | 6.2 | 7.6 | — | 4.6 | 9.7 | — | 3.0 |
| C-288.4ev*** | 2.7 | — | 1.9 | 2.2 | — | 1.5 | 2.9 | — | 1.6 |
| O | 50.5 | 66.1 | 54.6 | 51.2 | 73.1 | 53.3 | 43.2 | 69.4 | 64.7 |
| S | 1.8 | 4.3 | — | 4.3 | 5.1 | — | 2.0 | 7.9 | 3.6 |
| Si | 8.6 | 12.0 | 20.2 | 7.2 | 8.1 | 25.1 | 3.6 | 4.5 | 5.7 |
| Al | 2.5 | 4.8 | 2.4 | 2.6 | 2.5 | 1.3 | 1.8 | 2.3 | 2.9 |
| Fe | 2.4 | 4.4 | 0.5 | 1.4 | 2.4 | — | 2.4 | 6.8 | 7.9 |
| Na | 0.5 | 0.7 | — | 0.5 | 0.3 | — | 0.8 | 0.4 | 1.0 |
| Ca | 2.7 | 3.6 | — | 4.8 | 4.9 | — | 1.2 | 5.9 | 2.6 |
| Mg | 0.3 | — | — | 0.3 | 0.6 | — | trace | 0.4 | trace |

*Saturated carbon
**C—OH, C—O—C, C—$NH_2$, C—SH
***C=O

What is claimed is:

1. In a method for remediating soil contaminated with hydrocarbons and heavy metals, comprising the steps of:

(a) contacting contaminated soil having 20% or more particles having a particle size of less than 0.05 mm diameter with a solvent for the hydrocarbon contaminant, in the presence of an aqueous bridging liquid immiscible with said solvent, while agitating to a degree to form soil agglomerates having an internal porosity and being substantially free of contaminants and solvent, wherein the bridging liquid is provided in an amount sufficient to fill the internal porosity of the soil agglomerates, and wherein the amount of bridging liquid and the degree of agitation are balanced to control the particle size of the soil agglomerates within a particle size range of 0.5 to 2 mm diameter and having a size distribution substantially as that of natural soil aggregates, while maintaining the soil at its natural humic content and improving its aggregate strength and agglomerate stability; and (b) separating the soil agglomerates, the soil agglomerates being substantially hydrocarbon contaminant and solvent-free, the improvement comprising, in step (a) adding along with the solvent a metal fixation agent selected from the group consisting of gypsum, sodium metaphosphate and calcium hydroxide, to concurrently fixate the heavy metals.

2. A method according to claim 1, wherein step (a) the contaminated soil, and the solvent and bridging liquid, are contacted either co-currently or counter-currently.

3. A method according to claim 1, including an additional step of recovering the solvent, and recycling it to step (a).

4. A method according to claim 1, wherein step (a) is conducted at a temperature within a range of 25° C. to 50° C., for a time period in the range of 2 to 10 minutes.

5. A method according to claim 1, including an additional step of leaching the agglomerates with water to remove water soluble salts.

6. A method according to claim 1, wherein water-soluble or water dispersible amendments to control agglomerate porosity, provide nutrients or both, are added to the soil during stop (a).

7. A method according to claim 1, wherein the solvent is selected from the group consisting of toluene, trichloroethylene, and hexane.

8. A method according to claim 1, wherein the aqueous bridging liquid is water.

9. A method according to claim 1, wherein the soil agglomerates have a median particle size of about 1–2 mm diameter.

10. A method according to claim 1, wherein the contaminated soil is a high fines content clay soil, containing about 34% clay and including a hydrocarbon contaminant.

11. A method according to claim 1, wherein the method is continuous.

12. A method according to claim 1, wherein the agitation is effected in a rotating mill containing mixing media.

13. A method according to claim 1, wherein the metal fixation agent is Included in an amount of about 1% w/w.

14. A method according to claim 1, wherein coarse sand is added as an agglomeration aid.

15. A method according to claim i, wherein steps (a) and (b) are repeated four or five times, as required.

16. A method according to claim 15, wherein after each cycle of steps (a) and (b) the soil agglomerates are broken down.

17. A method according to claim 16, wherein the metal fixation agent is calcium hydroxide.

18. A method according to claim 16, wherein the metal fixation agent is gypsum and the solvent is hexane.

19. A method according to claim 1, wherein the metal fixation agent is gypsum.

20. A method according to claim 1, wherein the metal fixation agent and solvent are selected from the group consisting of gypsum/hexane and sodium metaphosphate/toluene.

* * * * *